United States Patent
Stallmann

(10) Patent No.: US 8,814,981 B2
(45) Date of Patent: Aug. 26, 2014

(54) COMPRESSION OF CARBON DIOXIDE CONTAINING FLUID

(71) Applicant: ALSTOM Technology Ltd, Baden (CH)

(72) Inventor: Olaf Stallmann, Essenheim (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/939,977

(22) Filed: Jul. 11, 2013

(65) Prior Publication Data

US 2013/0291719 A1    Nov. 7, 2013

Related U.S. Application Data

(63) Continuation of application No. PCT/IB2012/000023, filed on Jan. 10, 2012.

(30) Foreign Application Priority Data

Jan. 14, 2011    (EP) .................................... 11150969

(51) Int. Cl.
*B01D 53/00* (2006.01)
*F25J 3/02* (2006.01)
*F25J 3/06* (2006.01)

(52) U.S. Cl.
CPC .............. *B01D 53/00* (2013.01); *B01D 53/002* (2013.01); *F25J 3/0266* (2013.01); *B01D 2257/504* (2013.01); *F25J 2230/80* (2013.01); *F25J 2235/80* (2013.01); *Y02C 10/04* (2013.01); *Y02C 10/12* (2013.01); *F25J 3/067* (2013.01)
USPC ...................... 95/39; 95/236; 415/1; 415/177

(58) Field of Classification Search
None
See application file for complete search history.

(56) References Cited

U.S. PATENT DOCUMENTS

| 5,931,021 | A | 8/1999 | Shnaid et al. | |
|---|---|---|---|---|
| 8,465,570 | B2 * | 6/2013 | Alban et al. | 95/39 |
| 8,512,440 | B2 * | 8/2013 | Monk et al. | 95/39 |
| 2009/0264695 | A1 * | 10/2009 | Hirl | 585/800 |
| 2010/0287123 | A1 * | 11/2010 | Verma et al. | 705/500 |

FOREIGN PATENT DOCUMENTS

| CA | 2 732 778 | 2/2010 |
|---|---|---|
| EP | 2 092 973 | 8/2009 |
| GB | 2 416 389 | 1/2007 |
| WO | 2009/106160 | 9/2009 |

* cited by examiner

*Primary Examiner* — Duane Smith
*Assistant Examiner* — Phillip Shao

(57) ABSTRACT

The present invention relates to a method of pressurizing a fluid comprising carbon dioxide, the method includes: obtaining the fluid from a unit for removing carbon dioxide from a process gas; compressing the fluid to a pressure above the critical pressure of carbon dioxide; and cooling the compressed fluid to a temperature above the critical temperature of carbon dioxide to produce a supercritical fluid. The invention further relates to an apparatus for pressurizing a fluid comprising carbon dioxide, the apparatus including: means for obtaining the fluid from a unit for removing carbon dioxide from a process gas; means for compressing the fluid to a pressure above the critical pressure of carbon dioxide; and means for cooling the compressed fluid to a temperature above the critical temperature of carbon dioxide to produce a supercritical fluid.

11 Claims, 2 Drawing Sheets

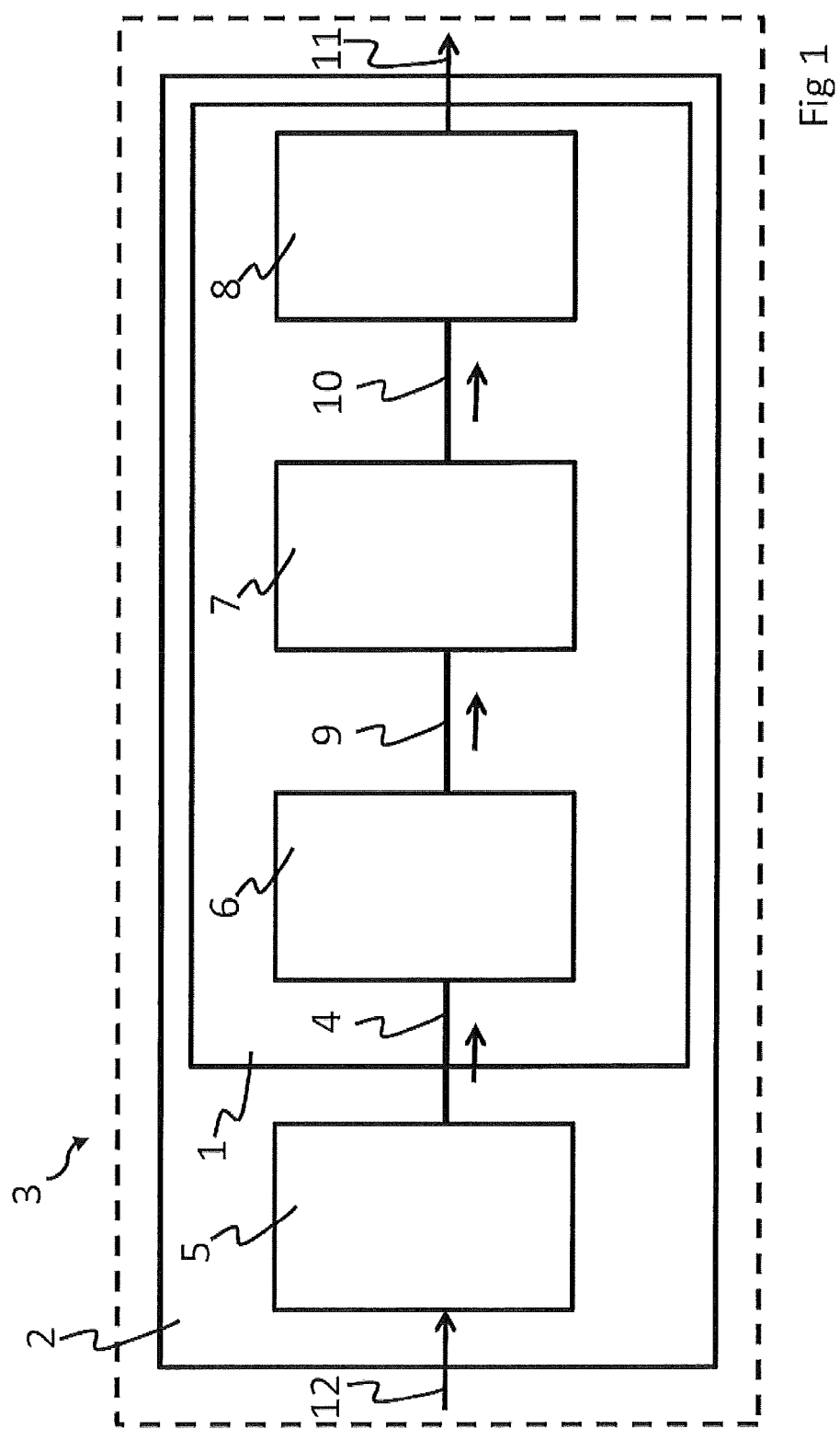

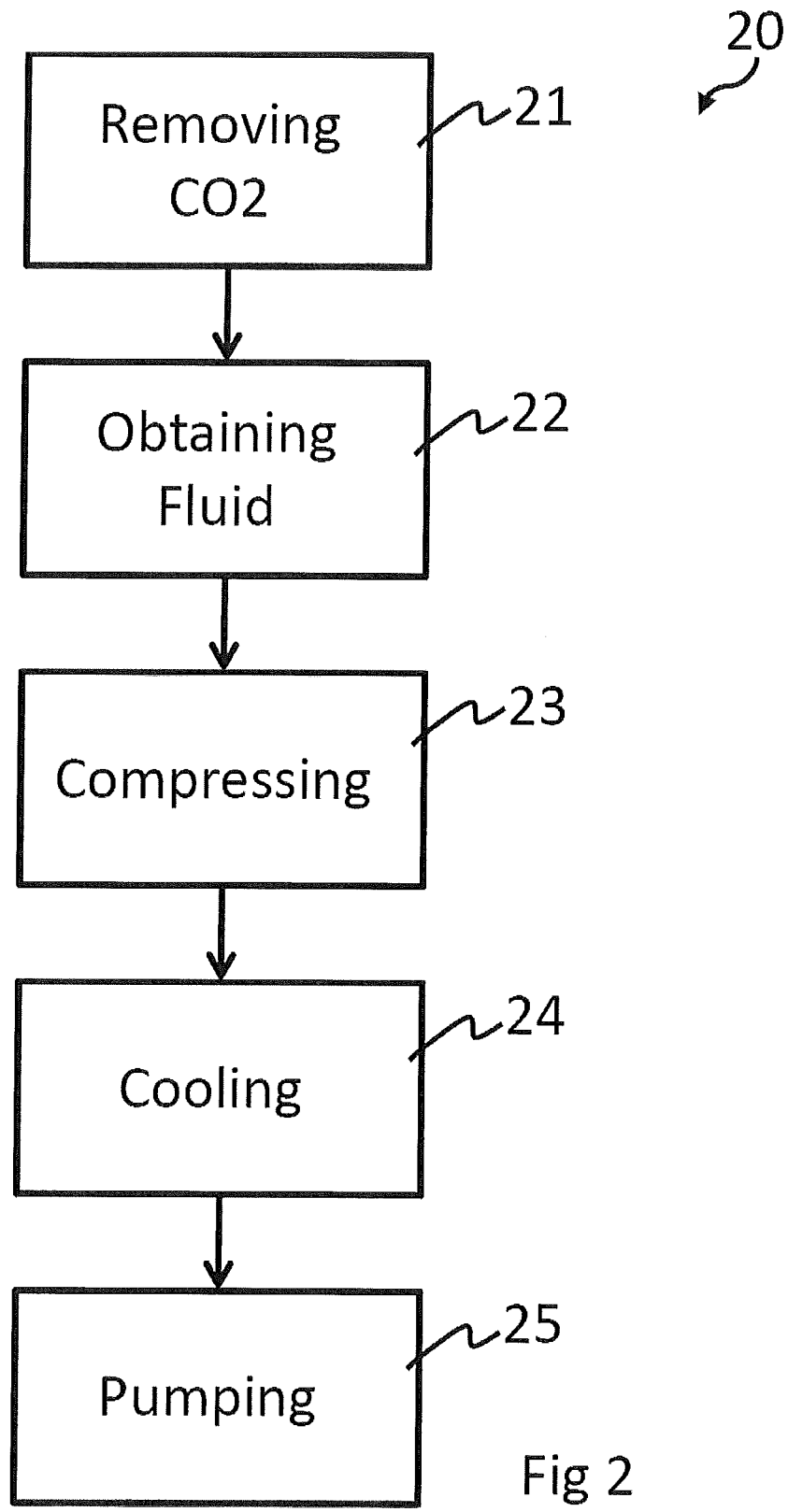

8,814,981 B2

COMPRESSION OF CARBON DIOXIDE CONTAINING FLUID

CROSS-REFERENCE TO RELATED APPLICATIONS

This application claims priority to PCT/IB2012/000023 filed Jan. 10, 2012, which claims priority to European Application 11150969.1 filed Jan. 14, 2011, both of which are hereby incorporated in their entireties.

TECHNICAL FIELD

The present disclosure relates to a method of pressurising a fluid comprising carbon dioxide ($CO_2$), as well as to an apparatus for pressurising a fluid comprising carbon dioxide, a system for removing carbon dioxide from a process gas and comprising said apparatus, and an oxy-combustion power plant comprising such a system.

BACKGROUND

Most of the energy used in the world today is derived from the combustion of carbon and hydrogen containing fuels such as coal, oil and natural gas, as well as other organic fuels. Such combustion generates flue gases containing high levels of carbon dioxide. Due to the concerns about global warming, there is an increasing demand for the reduction of emissions of carbon dioxide to the atmosphere, why methods have been developed to remove the carbon dioxide from flue gases before the gas is released to the atmosphere.

Prior to carbon dioxide separation, the flue gas may be cleaned from other constituents and air pollutants, such as particles, $SO_X$, $NO_X$, mercury and water.

After purification and separation of carbon dioxide, a carbon dioxide rich stream is obtained and need to be handled, such as by storing and transportation in tanks (stationary or on a truck or ship), transporting via pipelines and/or pumping into the ground for prolonged (definitive) storage and mineralisation.

In order to reduce the amount of flue gas, and thus the dimensions of a power plant and its gas cleaning arrangements, as well as to facilitate the purification and removal of carbon dioxide, oxygen may be used instead of air in a combustion furnace, generating a flue gas with a high carbon dioxide concentration and a low nitrogen concentration. The oxygen may be obtained from separating air into an oxygen stream and a nitrogen stream by means of an air separation unit (ASU).

U.S. Pat. No. 5,931,021 discloses the liquefaction of gases with compression to supercritical pressure and the cooling by an external refrigerant to a predetermined final temperature that is lower than the saturation temperature of the liquefied gas, after which the cooled supercritical pressure gas is throttled to a prescribed subcritical pressure of the liquid. As a result, the gas is said to be liquefied without generating any flash gas.

GB 2416389 discloses the optimum values for transport and storage of liquid $CO_2$ to be a temperature below ambient and a pressure above ambient but still sub-critical. The document focuses on how to best obtain liquid $CO_2$ at the optimal temperature and pressure, and concludes that production of liquid carbon dioxide in bulk and at temperatures and pressures desirable for bulk transport may be effected in an environmentally friendly and efficient manner by producing liquid or dense fluid carbon dioxide at temperatures and pressures above the desired values and then expanding it to generate liquid carbon dioxide at the desired values.

EP 2 092 973 discloses subjecting $CO_2$ from a power plant to multi-stage compression to 80-90 bar with intermittent cooling to give a fluid of 120-140° C., and then cooling to 10-30° C., after which the fluid may be pumped to 400 bar.

SUMMARY

According to an aspect of the present disclosure, there is provided a method of pressurising a fluid comprising carbon dioxide, the method comprising: obtaining the fluid from a unit for removing carbon dioxide from a process gas; compressing the fluid to a pressure above the critical pressure of carbon dioxide; and cooling the compressed fluid to a temperature above the critical temperature of carbon dioxide to produce a supercritical fluid.

The method may further comprise: pumping the supercritical fluid.

The method may further comprise: removing carbon dioxide from a process gas to form a carbon dioxide rich fluid, which is the fluid comprising carbon dioxide obtained according to the method.

According to an other aspect of the present disclosure, there is provided an apparatus for pressurising a fluid comprising carbon dioxide, the apparatus comprising: means for obtaining the fluid from a unit for removing carbon dioxide from a process gas; means for compressing the fluid to a pressure above the critical pressure of carbon dioxide; and means for cooling the compressed fluid to a temperature above the critical temperature of carbon dioxide to produce a supercritical fluid.

The apparatus may further comprise: means for pumping the supercritical fluid.

According to an other aspect of the present disclosure, there is provided an apparatus for pressurising a fluid comprising carbon dioxide, the apparatus comprising: a conduit for obtaining the fluid from a unit for removing carbon dioxide from a process gas; a compressor for compressing the fluid to a pressure above the critical pressure of carbon dioxide; and a cooler for cooling the compressed fluid to a temperature above the critical temperature of carbon dioxide to produce a supercritical fluid.

The apparatus may further comprise: a pump for pumping the supercritical fluid.

According to an other aspect of the present disclosure, there is provided a system for removing carbon dioxide from a process gas, wherein the system comprises the apparatus of any one of the apparatus aspects above.

The system may further comprise a unit for removing carbon dioxide from a process gas to form a carbon dioxide rich fluid, which fluid is a fluid comprising carbon dioxide that may be compressed using the apparatus of any one of the apparatus aspects above.

According to an other aspect of the present disclosure, there is provided an oxy-combustion power plant, wherein the oxy-combustion power plant comprises the system above and the system is arranged to remove carbon dioxide from a flue gas of said power plant.

Discussions above and below relating to any one of the respective aspects of the present disclosure are also, in applicable parts, relevant to any of the other aspects.

It has surprisingly been found that a super-critical carbon dioxide ($CO_2$) containing fluid may be adequately pumped for pressurisation and transport, thus removing the need to obtain liquid $CO_2$ for pumping. Handling gaseous fluid may be undesirable due to the large volume of a gas and the risk of leakage to the atmosphere. The use of compressors is also desirably reduced since they require continuous cooling. Pumping is thus preferred.

By cooling the fluid to a temperature above the critical temperature, 31° C., of $CO_2$ to obtain a super-critical fluid, instead of a liquid, a lower requirement is put on the cooling and the coolant. Conventional ambient coolant may be used, also at relatively warm ambient temperatures, such as during the summertime, and the energy requirement is reduced, improving the efficiency of the whole system, such as a power plant.

Further, a super-critical fluid has the advantage of forming a one-phase fluid. The fluid may very well comprise other components than $CO_2$, such as Ar, $N_2$, $O_2$, $SO_x$, $NO_x$, $H_2O$, $H_2$ and/or $CH_4$. Even a highly purified $CO_2$ stream from a power plant will comprise some impurities. Thus, if the fluid is cooled to form liquid $CO_2$, other components of the fluid may occur in gaseous form, whereby a two-phase system is formed. A one-phase fluid is much more easily handled than a two-phase fluid, which may impede the pumping and require bulkier equipment to handle the more voluminous fluid.

Also, since a two-phase fluid may be avoided, there may be a lower requirement on the purity of the $CO_2$ containing fluid.

BRIEF DESCRIPTION OF THE DRAWINGS

Currently preferred embodiments will below be discussed with reference to the drawings, in which:

FIG. 1 is a schematic partial side view illustration of a power plant comprising an embodiment of an apparatus according to the present disclosure.

FIG. 2 is a schematic block diagram illustrating an embodiment of a method according to the present disclosure.

DETAILED DESCRIPTION

The process gas may be any type of process gas containing carbon dioxide, such as flue gas from any combustion device such as furnaces, process heaters, incinerators, package boilers, and power plant boilers.

The apparatus, system and power plant of the present disclosure comprises piping that connects their different parts and is arranged to allow respective fluids to flow through the apparatus/system/power plant as needed. The piping may comprise conduits, valves, pumps, compressors, fans, nozzles, heat exchangers etc. as appropriate to control the flow and properties of respective fluids.

The critical temperature of $CO_2$ is about 31° C., and the critical pressure of $CO_2$ is about 7.38 MPa.

The removal of $CO_2$ from the process gas to produce a $CO_2$ containing fluid may be accomplished in any way possible, such as by absorption or dissolving by and later recovery from an aminated or ammoniated solution, by anti-sublimation, by distillation and/or by adsorption by and later recovery from a solid adsorbent. The unit for removal of $CO_2$ from a process gas may utilise any of these techniques, or any other, for producing the fluid comprising $CO_2$.

The fluid comprising $CO_2$ may be obtained in any suitable way, such as via a conduit, e.g. a pipe, from the unit for removal of $CO_2$ from a process gas to a compressor for compressing the fluid. Alternatively, the compressor might not be connected directly with the unit for removal of $CO_2$. The fluid comprising $CO_2$ may e.g. be stored and transported in a tank to the compressor, and/or be stored in a tank at the compressor for later compression, and may be obtained from the tank via a suitable conduit.

The compressor, or means for compressing, may be any compressor or the like able to compress the fluid comprising $CO_2$. The compression may be performed in a single step, or in several consecutive steps, optionally with intermittent cooling, by a plurality of serially arranged compressors.

The compression of the fluid is performed to a pressure above the critical pressure of $CO_2$, i.e. to above 7.38 MPa, such as to at least 7.4 MPa, at least 8 MPa, at least 9 MPa, at least 10 MPa or at least 11 MPa. It may not be desirable to compress the fluid to a pressure which is higher than necessary to ensure obtaining a super-critical fluid, preferably a one-phase super-critical fluid, in order to keep down the energy requirement for compression and the equipment costs. Thus, the fluid comprising $CO_2$ may be compressed to a pressure of at most 20 MPa, such as at most 15 MPa, at most 12 MPa, at most 11 MPa or at most 10 MPa. The fluid comprising $CO_2$ may be compressed to a pressure within the range of from 7.4 MPa to 20 MPa, such as from 9-12 MPa or from 10-11 MPa.

The cooling of the compressed fluid may be performed by means of any cooler or the like means for cooling able to cool the compressed fluid. The means for cooling may be a heat exchanger. Heat-exchange may be direct, wherein the two media physically meet, or indirect, wherein the media are separated, e.g. by a solid wall allowing heat transfer. Heat-exchanging may for example take place in a packed column, a tray column, a plate and frame heat exchanger or a shell and tube heat exchanger.

Coolant of the means for cooling may be any cooling medium able to cool the compressed fluid to a temperature above the critical temperature of $CO_2$, such as a conventional ambient coolant, e.g. ambient air, tap water, sea/lake water or water from a cooling tower. Since the compressed fluid is only cooled to above the critical temperature of $CO_2$,' a cooling medium of ambient temperature may often be used, or a relatively lightly chilled cooling medium, such as water from a cooling tower.

The compressed fluid is cooled to a temperature above the critical temperature of $CO_2$, i.e. to a temperature of at least 31° C. (304 K), such as to at least 35° C. or at least 40° C. It may be desirable to recover as much heat as possible from the fluid while ensuring that the fluid remains in the form of a super-critical fluid, preferably a one-phase super-critical fluid, and while still being able to use an ambient coolant, why the fluid may be cooled to at most 50° C., such as to at most 40° C. or at most 35° C. The compressed fluid may be cooled to within the range of from 31° C. to 50° C., such as from 31° C. to 40° C., from 35° C. to 40° C. or from 31° C. to 35° C. such as about 33° C., depending on e.g. the ambient temperature where the apparatus is located for use of readily accessible and cheap ambient coolant.

The super-critical fluid, after compression and cooling, may be successfully pumped by means of a pump or other pumping means. The super-critical fluid may e.g. be pumped to increased pressure, such as for storage or transport in a pipeline or into the ground. In order to avoid damage due to insufficient lubrication and/or performance loss due to the compressibility of the super-critical fluid during pumping, the density of the super-critical fluid is conveniently high enough to approach the density of a corresponding liquid fluid. The density of the super-critical fluid, e.g. directly after the cooling, may thus be at least 600 kg/m$^3$, such as at least 630 kg/m$^3$, at least 650 kg/m$^3$, at least 670 kg/m$^3$, at least 700 kg/m$^3$ or at least 720 kg/m$^3$. In order to keep down the energy requirement, it may be convenient to compress the fluid to a density, e.g. a density directly after the cooling, of at most 800 kg/m$^3$, such as at most 750 kg/m$^3$ or at most 700 kg/m$^3$.

It may be convenient with the fluid comprising $CO_2$ to have a high concentration of $CO_2$. It may e.g. be undesirable to use energy and space for handling and storing other, contaminating, components of the fluid. Thus, the fluid conveniently comprises at least 80 mol-% $CO_2$, such as at least 85 mol-%, at least 90 mol-%, at least 92 mol-%, at least 94 mol-%, at least 96 mol-% or at least 98 mol-% $CO_2$. On the other hand, it may not be convenient to use more energy and more expensive equipment to purify the $CO_2$ comprising fluid to a high purity. There is thus a trade-off between the cost of handling an impure fluid and of purifying the fluid. As discussed above, the method and apparatus of the present disclosure may give a higher tolerance for impurities since the fluid is super-critical instead of liquid. The fluid may thus comprise at most 99.9 mol-% $CO_2$, such as at most 99 mol-%, at most 98 mol-%, at most 97 mol-%, at most 96 mol-%, at most 95 mol-%, at most 90 mol-% or at most 85 mol-% $CO_2$. The fluid comprising $CO_2$ may e.g. comprise at least 0.1 mol-%, such as at least 1 mol-%, at least 2 mol-%, at least 3 mol-%, at least 4 mol-%, at least 5 mol-%, at least 10 mol-% or at least 15 mol-% of impurities, such as argon (Ar), nitrogen ($N_2$), oxygen ($O_2$), sulphur oxide(s) ($SO_X$), nitrogen oxide(s) ($NO_X$), water ($H_2O$), hydrogen ($H_2$) and/or methane ($CH_4$).

With reference to FIG. 1, an apparatus, a system and an oxy-combustion power plant of the present disclosure will be discussed.

The apparatus 1 for pressurising a fluid comprising carbon dioxide may be arranged as part of a system 2 for removing carbon dioxide from a process gas, wherein the system may be arranged as part of an oxy-combustion power plant 3.

The apparatus 1 comprises a means for compressing the fluid to a pressure above the critical pressure of carbon dioxide, such as a compressor 6. The compressor 6 may be a compressor as discussed above. The compressor 6 is arranged for obtaining the fluid comprising $CO_2$, e.g. in gaseous form, via the conduit 4, e.g. a pipe, connecting the compressor 6 with a unit 5 for removing $CO_2$ from a process gas such that the fluid comprising $CO_2$, which fluid may be a fluid containing essentially all of the $CO_2$ removed from said process gas by the unit 5, may flow or be otherwise transported from the unit 5 to the compressor 6 via the pipe conduit 4, as indicated by the arrow along the conduit 4.

The unit 5, of the system 2, for removing $CO_2$ from a process gas may be arranged for removing the $CO_2$ by any of the $CO_2$ removal methods mentioned above, or any other such methods, and may be arranged to remove $CO_2$ from a flue gas of the oxy-combustion power plant 3. The unit 5 may be arranged to receive the flue gas via an inlet conduit 12, e.g. a pipe, at which time the flue gas may be in any fluid form and not necessarily a gas.

Returning to the compressor 6, it may be further arranged in fluid connection with a means for cooling the compressed fluid, such as a cooler 7, via the conduit 9, e.g. a pipe, connecting the compressor 6 with the cooler 7 such that the fluid compressed by the compressor 6 may flow or be otherwise transported from the compressor 6 to the cooler 7 via the pipe conduit 9, as indicated by the arrow along the conduit 9. The cooler is arranged to produce a compressed and cooled super-critical fluid.

The cooler 7 may be a cooler as discussed above. The cooler 7 may be further arranged in fluid connection with a means for pumping the compressed and cooled supercritical fluid, such as a pump 8, via the conduit 10, e.g. a pipe, connecting the cooler 7 with the pump 8 such that the fluid cooled by the cooler 7 may flow or be otherwise transported from the cooler 7 to the pump 8 via the pipe conduit 10, as indicated by the arrow along the conduit 10.

The pump 8 may be any pumping means capable of pumping the super-critical $CO_2$ containing fluid leaving the cooler 7, for e.g. raising the pressure of or transporting said super-critical fluid. The pump 8 may be arranged with an outlet conduit 11, e.g. a pipe, for allowing the super-critical fluid being pumped by the pump 8 to leave the pump 8. The conduit 11 may e.g. direct the fluid for further handling within the power plant 3 or direct the fluid for transportation and/or storage outside of the power plant 3.

With reference to FIG. 2, a specific method 20 of the present disclosure will now be discussed.

A process gas containing $CO_2$, e.g. from the power plant 3, may be processed by a unit for removing, step 21, $CO_2$ from said process gas, e.g. by the unit 5. Thus, a fluid comprising $CO_2$ is formed by the $CO_2$ removed by means of the unit.

The fluid comprising $CO_2$ may then be obtained, step 22, from the unit 5 for further processing, e.g. by forwarding it to a means for compressing the fluid, such as the compressor 6.

The fluid may be compressed, step 23, by the compressor 6, such that the fluid is compressed to a pressure above the critical pressure of $CO_2$, after which the compressed fluid may be forwarded to a means for cooling the compressed fluid, such as the cooler 7.

The fluid may be cooled, step 24, by the cooler 7, such that the fluid is cooled to a temperature above the critical temperature of $CO_2$ to produce a compressed and cooled super-critical fluid, after which said super-critical fluid may be forwarded to a means for pumping the super-critical fluid, such as the pump 8.

The super-critical fluid may be pumped, step 25, for e.g. raising the pressure of or transporting said super-critical fluid within or outside of the power plant 3.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode currently contemplated for carrying out this invention, but that the invention will include all embodiments falling within the scope of the appended claims. Moreover, the use of the terms first, second, etc. do not denote any order or importance or chronology, but rather the terms first, second, etc. are used to distinguish one element from another.

What is claimed is:

1. A method of pressurizing a fluid comprising carbon dioxide, the method comprising:
   obtaining the fluid from a unit for removing carbon dioxide from a process gas;
   compressing the fluid to a pressure above the critical pressure of carbon dioxide, the fluid being compressed to a pressure within the range of 9-12 MPa; and
   cooling the compressed fluid to a temperature above the critical temperature of carbon dioxide to produce a supercritical fluid; and
   wherein the fluid is compressed and cooled such that the compressed and cooled fluid is a one phase supercritical fluid.

2. The method according to claim 1, further comprising: pumping the supercritical fluid.

3. The method according to claim 1, wherein in the compressing of the fluid, the fluid is compressed to a pressure within the range of 9-12 MPa.

4. The method according to claim 1, wherein the compressed and cooled fluid has a density of at least 600 kg/m3.

5. The method according to claim 1, wherein the fluid comprises at least 92 mol-% carbon dioxide.

6. The method according to claim 1, wherein the fluid comprises at most 99.9 mol-% carbon dioxide.

7. The method according to claim 6, wherein the fluid comprises at least 0.1 mol-%, of impurities, the impurities comprising at least one of Ar, $N_2$, $O_2$, $SO_X$, $NO_X$, $H_2O$, $H_2$ and $CH_4$.

8. The method according to claim 1, wherein the obtained fluid is a flue gas from an oxy-combustion power plant.

9. The method of claim 1, wherein the fluid comprises at least 80 mol-% carbon dioxide.

10. The method of claim 9, wherein the fluid also comprises at least 1 mol-% of impurities, the impurities comprising at least one of Ar, $N_2$, $O_2$, $SO_X$, $NO_X$, $H_2O$, $H_2$ and $CH_4$.

11. A method of pressurizing a fluid comprising carbon dioxide, the method comprising:
    obtaining the fluid from a unit for removing carbon dioxide from a process gas, the fluid comprising at least 80 mol-% carbon dioxide and at most 90 mol-% carbon dioxide;
    compressing the fluid to a pressure above the critical pressure of carbon dioxide; and
    cooling the compressed fluid to a temperature above the critical temperature of carbon dioxide to produce a supercritical fluid; and
    wherein the fluid is compressed and cooled such that the compressed and cooled fluid is a one phase supercritical fluid.

* * * * *